US012637638B2

(12) United States Patent
Wada et al.

(10) Patent No.: US 12,637,638 B2
(45) Date of Patent: May 26, 2026

(54) RINSING SOLUTION, METHOD OF TREATING SUBSTRATE, AND METHOD OF MANUFACTURING SEMICONDUCTOR DEVICE

(71) Applicant: TOKYO OHKA KOGYO CO., LTD., Kanagawa (JP)

(72) Inventors: Yukihisa Wada, Kanagawa (JP); Natsumi Okawa, Kanagawa (JP); Satoshi Fujimura, Kanagawa (JP); Takayuki Haraguchi, Kanagawa (JP); Kazumasa Wakiya, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 505 days.

(21) Appl. No.: 18/168,124

(22) Filed: Feb. 13, 2023

(65) Prior Publication Data

US 2023/0265362 A1 Aug. 24, 2023

(30) Foreign Application Priority Data

Feb. 18, 2022 (JP) ................................. 2022-024190

(51) Int. Cl.
*C11D 3/20* (2006.01)
*C11D 7/26* (2006.01)

(52) U.S. Cl.
CPC ............ *C11D 7/263* (2013.01); *C11D 3/2068* (2013.01); *C11D 2111/22* (2024.01)

(58) Field of Classification Search
CPC ......... C11D 3/2068; C11D 7/263; B08B 3/08; B08B 3/10
USPC ......... 510/175, 176, 178, 505, 506; 134/1.2, 134/1.3
See application file for complete search history.

(56) References Cited

U.S. PATENT DOCUMENTS

| | | | | |
|---|---|---|---|---|
| 8,747,564 B2* | 6/2014 | Nakamura | ............. | C11D 7/265 134/41 |
| 2005/0252523 A1* | 11/2005 | Ishikawa | ............. | C11D 7/5004 134/1 |
| 2010/0311630 A1* | 12/2010 | Mori | ..................... | H01L 21/321 510/175 |
| 2013/0330927 A1* | 12/2013 | Kumagai | ............... | C11D 7/263 510/176 |
| 2014/0142017 A1* | 5/2014 | Peters | ..................... | G03F 7/422 510/176 |

(Continued)

FOREIGN PATENT DOCUMENTS

| | | | | |
|---|---|---|---|---|
| EP | 2857900 A1 * | 4/2015 | ............... | G03F 7/16 |
| EP | 3396702 A1 * | 10/2018 | ............... | C11D 7/28 |

(Continued)

*Primary Examiner* — Gregory R Delcotto
(74) *Attorney, Agent, or Firm* — Rankin, Hill & Clark LLP

(57) ABSTRACT

A rinsing solution for rinsing a substrate with a protrusion portion, including an organic solvent (S1) that contains no hydroxyl group or fluorine atom and that has a dynamic viscosity of equal to or smaller than $1.05\times10^{6}$ $m^2/s$. A method of treating a substrate with a protrusion portion, including a step (A) of bringing the rinsing solution into contact with a surface of the substrate with the protrusion portion, the protrusion portion being formed on the surface; and a step (B) of removing the rinsing solution from the surface on which the protrusion portion is formed.

8 Claims, 3 Drawing Sheets

(56) References Cited

U.S. PATENT DOCUMENTS

| | | | | |
|---|---|---|---|---|
| 2016/0179011 | A1* | 6/2016 | Agarwal | C11D 7/267 510/176 |
| 2017/0081622 | A1* | 3/2017 | Inaoka | H01L 21/02068 |
| 2017/0330762 | A1* | 11/2017 | Kamei | H01L 21/3212 |

FOREIGN PATENT DOCUMENTS

| | | | | |
|---|---|---|---|---|
| EP | 3599633 | A1 * | 1/2020 | C11D 7/263 |
| JP | 2018530157 | A | 10/2018 | |
| JP | 2020536379 | A | 12/2020 | |
| WO | 2017059235 | A1 | 4/2017 | |
| WO | 2019067833 | A2 | 4/2019 | |
| WO | 2020/039784 | A1 | 2/2020 | |
| WO | WO-2020083809 | A1 * | 4/2020 | G03F 7/40 |

* cited by examiner

RINSING SOLUTION, METHOD OF TREATING SUBSTRATE, AND METHOD OF MANUFACTURING SEMICONDUCTOR DEVICE

BACKGROUND OF THE INVENTION

Field of the Invention

The present invention relates to a rinsing solution, a method of treating a substrate, and a method of manufacturing a semiconductor device.

Priority is claimed on Japanese Patent Application No. 2022-024190, filed Feb. 18, 2022, the content of which is incorporated herein by reference.

DESCRIPTION OF RELATED ART

In recent years, in the manufacture of semiconductor devices or liquid crystal display devices, patterns of semiconductor substrates have been made more fine due to the advanced lithography technology. As patterns of semiconductor substrates become finer, an aspect ratio of the patterns of the semiconductor substrates tends to increase.

On the other hand, in the manufacturing process of semiconductors, a decrease in the manufacturing yield occurs due to contamination with residues, particles, and the like after dry etching. Therefore, in order to remove residues remaining on substrates, particles adhering to the substrates, and the like, the substrates are subjected to a chemical treatment with a cleaning solution. After the chemical treatment, a rinsing treatment with pure water or the like for supplying pure water to the substrates to remove the chemical, and drying treatment for removing fluid on the substrates to rotate the substrates at high speed are further carried out. A rinsing solution used in a rinsing treatment is not limited to pure water, and other solvents may be used. In a case where the rinsing treatment and the drying treating are carried out in order, the rinsing solution (not limited to pure water) is removed because the substrates are dried. However, in a case where fine patterns are formed on the substrates, pattern collapse of the patterns on surfaces of the substrates may occur during the drying of the substrates due to the capillary force of the rinsing solution remaining in the patterns.

Specifically, examples of a method of preventing the occurrence of pattern collapse include a 2-propanol (IPA) application method (IPA method) in which IPA is supplied to a substrate after carrying out rinsing treatment with pure water following chemical treatment, and the IPA having a lower surface tension than water is shaken off and dried, and a method of replacing a rinsing solution on a substrate with IPA (hot IPA method) in which the IPA is supplied to a heated substrate, or the heated IPA is supplied to a substrate (Patent Document 1). An example of the hot IPA method includes, for example, the following procedure. After the rinsing treatment, the IPA is supplied to an upper surface of the substrate to replace the rinsing solution, thereby forming an IPA fluid film on the substrate. Next, the substrate is heated to form an IPA vapor film between the IPA fluid film and the upper surface of the substrate, the IPA fluid film thereby floats from the upper surface of the substrate, and as a result, the fluid film is removed from the substrate. In a case where the IPA fluid film is removed from the substrate, nitrogen gas is blown onto the central portion of the fluid film to partially remove the fluid film, thereby forming a small-diameter dry region. Furthermore, nitrogen gas is blown onto the central portion while rotating the substrate, and the dry region is expanded to cover the entire upper surface of the substrate. As a result, the upper surface of the substrate is dried while preventing the pattern collapse.

SUMMARY OF THE INVENTION

However, in the case of cleaning a substrate having a pattern with a high aspect ratio, the IPA method and hot IPA method in the related art may not be able to sufficiently prevent the pattern collapse.

The present invention is made in view of the above-described circumstances, and an object of the present invention is to provide a rinsing solution that is highly effective in preventing pattern collapse, a method of treating a substrate by using the rinsing solution, and a method of manufacturing a semiconductor device.

In order to solve the above problem, the present invention has adopted the following configuration.

A first aspect of the present invention is a rinsing solution for rinsing a substrate with a protrusion portion including an organic solvent (S1) that contains no hydroxyl group or fluorine atom, and that has a dynamic viscosity of equal to or smaller than $1.05\times10^{6}$ $m^2/s$.

A second aspect of the present invention is a rinsing solution for rinsing a substrate with a protrusion portion including a compound represented by General Formula (S1-1).

$$R^1\text{—}(OCH_3)_{n1} \quad \text{(S1-1)}$$

[In Formula (S1-1), $R^1$ represents a linear or branched saturated aliphatic hydrocarbon group having 1 to 3 carbon atoms; and n1 represents 2 or 3.]

A third aspect of the present invention is a method of treating a substrate with a protrusion portion including (A) bringing the rinsing solution according to the first aspect or the second aspect into contact with a surface of the substrate with the protrusion portion, the protrusion portion being formed on the surface; and (B) removing the rinsing solution from the surface.

A fourth aspect of the present invention is treating a substrate with a protrusion portion by the method of treating a substrate according to the third aspect.

According to the present invention, the rinsing solution that is highly effective in preventing pattern collapse, the method of treating a substrate by using the rinsing solution, and the method of manufacturing a semiconductor device are provided.

Figure 1:
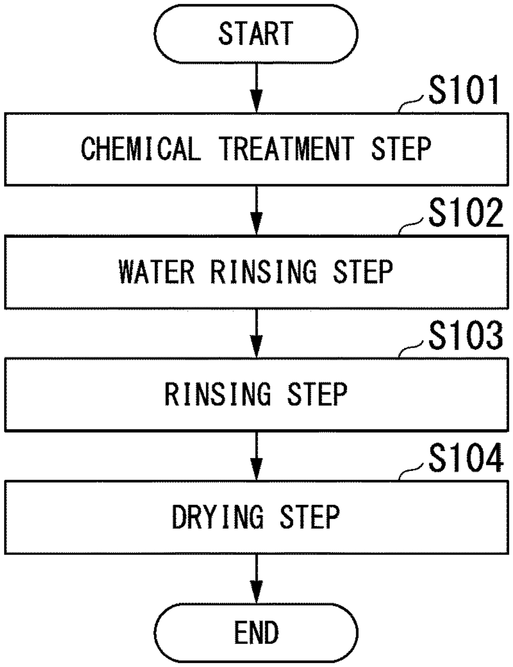
FIG. 1 is a flowchart showing an example of a method of treating a substrate.

DETAILED DESCRIPTION OF THE INVENTION (Rinsing Solution)

A rinsing solution according to a first aspect of the present invention contains an organic solvent (S1) that contains no hydroxyl group or fluorine atom, and that has a dynamic viscosity of equal to or smaller than $1.05\times10^6$ $m^2/s$.

The rinsing solution according to the second aspect of the present invention contains a compound represented by General Formula (S1-1) that will be described later. The compound represented by General Formula (S1-1) usually corresponds to the organic solvent (S1), but may also include something that does not correspond to the organic solvent (S1).

The rinsing solution according to the above aspect is used to rinse a substrate with a protrusion portion.

<Organic Solvent (S1)>

The organic solvent (S1) is an organic solvent that contains no hydroxyl group or fluorine atom and that has a dynamic viscosity of equal to or smaller than $1.05\times10^6$ $m^2/s$.

As shown in Examples that will be described later, a search was made for a rinsing solution having a higher pattern collapse effect than IPA, and it was found that by using an organic solvent having a dynamic viscosity of equal to or smaller than $1.05\times10^6$ $m^2/s$, the pattern collapse was further prevented than that of IPA. In a case where the dynamic viscosity is equal to or smaller than $1.05\times10^6$ $m^2/s$, the rinsing solution tends to spread uniformly on the substrate. It is conceivable that this may contribute to the prevention of pattern collapse.

Although a lower limit value of the dynamic viscosity of the organic solvent (S1) is not particularly limited, the lower limit value may be, for example, equal to or greater than $1.0\times10^4$ $m^2/s$. The dynamic viscosity of the organic solvent (S1) is, for example, equal to or greater than $1.0\times10^4$ $m^2/s$, equal to or greater than $5.0\times10^4$ $m^2/s$, equal to or greater than $1.0\times10^5$ $m^2/s$, equal to or greater than $5.0\times10^5$ $m^2/s$, equal to or greater than $6.0\times10^5$ $m^2/s$, equal to or greater than $7.0\times10^5$ $m^2/s$, equal to or greater than $6.0\times10^5$ $m^2/s$, or equal to or greater than $9.0\times10^5$ $m^2/s$.

The dynamic viscosity of the organic solvent can be calculated by the following Formula (1).

$$\text{Dynamic viscosity } (m^2/s) = \text{viscosity } (cp)/\text{density } (g/ml) \quad (1)$$

The viscosity is a viscosity at 25° C. The viscosity may be an actual measurement value or a theoretical value. In the case of using the actual measurement value, the viscosity at 25° C. may be measured with a viscometer. In the case of using the theoretical value, an estimated value calculated by using software such as HSPiP may be used.

The density is a density at 25° C. The density may be an actual measurement value or a theoretical value. In the case of using the actual measurement value, the density at 25° C. may be measured with a densimeter. In the case of using the theoretical value, an estimated value calculated by using software such as HSPiP may be used.

The organic solvent (S1) has a feature of containing neither hydroxyl group nor fluorine atom. Since the organic solvent (S1) contains no hydroxyl group, an intermolecular hydrogen bond does not become too strong, and the surface tension tends to be low. In addition, an organic solvent containing fluorine has a high ozone depletion potential and a high global warming potential, and has a large environmental impact. Since the organic solvent (S1) contains no fluorine atom, the load on the environment can be reduced.

The organic solvent (S1) may have a latent heat of vaporization of equal to or smaller than 40 KJ/mol at the boiling point. The latent heat of vaporization at the boiling point is preferably equal to or greater than 20 KJ/mol and equal to or smaller than 40 KJ/mol, and more preferably equal to or greater than 25 KJ/mol and equal to or smaller than 40 KJ/mol. The latent heat of vaporization at the boiling point can be calculated by the Joback method.

The organic solvent (S1) may have a latent heat of vaporization of equal to or smaller than 43 KJ/mol at 25° C. The latent heat of vaporization at 25° C. is preferably equal to or greater than 20 KJ/mol and equal to or smaller than 43 KJ/mol, and more preferably equal to or greater than 25 KJ/mol and equal to or smaller than 43 KJ/mol.

The organic solvent (S1) may have a latent heat of vaporization of equal to or smaller than 45 KJ/mol at 60° C. The latent heat of vaporization at 25° C. is preferably equal to or greater than 20 KJ/mol and equal to or smaller than 45 KJ/mol, and more preferably equal to or greater than 25 KJ/mol and equal to or smaller than 45 KJ/mol.

The latent heat of vaporization at 25° C. and 60° C. can be calculated by the Watson Formula.

In a case where the latent heat of vaporization of the organic solvent (S1) is equal to or smaller than the above preferable upper limit value, moisture in the air is less likely to condense during volatilization of the organic solvent (S1). Therefore, defects due to watermarks are less likely to remain on the substrate, and as a result, the number of defects on the substrate after rinsing and drying can be reduced.

Values of the Hansen solubility parameters of the organic solvent (S1) may be approximate to those of the Hansen solubility parameters of carbon dioxide ($CO_2$). In a case where the Hansen solubility parameters of the organic solvent (S1) have values approximate to those of the Hansen solubility parameters of carbon dioxide, the compatibility between the organic solvent (S1) and carbon dioxide increases. In a case where the compatibility with $CO_2$ is high, the organic solvent (S1) is easily replaced by supercritical $CO_2$ in the case of carrying out supercritical drying by using supercritical $CO_2$.

The Hansen solubility parameters can be calculated from predetermined parameters based, for example, on solubility parameters and aggregation properties as described by Charles Hansen in Charles M. Hansen, "Hansen Solubility Parameters: A User's Handbook", CRC Press (2007) and "The CRC Handbook and Solubility Parameters and Cohesion Parameters," edited by Allan F. M. Barton (1999). For example, software such as HSPiP can be used to calculate the Hansen solubility parameter.

The Hansen solubility parameters are theoretically calculated as numerical constants and are a useful tool for predicting the ability of a solvent material to dissolve a particular solute.

The Hansen solubility parameters can be a measure of the overall strength and selectivity of a material by combining the following three experimentally and theoretically derived Hansen solubility parameters (δD, δP, and δH). The units for the Hansen solubility parameters are given in $MPa^{0.5}$ or $(J/cc)^{0.5}$.

δD: Energy derived from intermolecular dispersion force.

δP: Energy derived from intermolecular polar force.

δH: Energy derived from intermolecular hydrogen bonding force.

The compatibility between the organic solvent (S1) and carbon dioxide may be indicated by an interaction distance (Ra) between the Hansen solubility parameters.

The Hansen solubility parameters (δD, δP, δH) are plotted as coordinates for points in three dimensions, also known as the Hansen space.

Within this three-dimensional space (Hansen space), the closer two molecules are, the more likely the two molecules are to dissolve into each other. In order to evaluate whether two molecules (molecules (1) and (2)) come closer to each other in the Hansen space, the interaction distance (Ra) between the Hansen solubility parameters is determined. Ra is calculated by the following Formula.

$$(Ra)^2 = 4(\delta_{d2} - \delta_{d1})^2 + (\delta_{p2} - \delta_{p1})^2 + (\delta_{h2} - \delta_{h1})^2$$

[In the above Formula, $\delta_{d1}$, $\delta_{p1}$, and $\delta_{h1}$ denote δD, δP, and δH of the molecule (1), respectively.

$\delta_{d2}$, $\delta_{p2}$, and $\delta_{h2}$ denote δD, δP, and δH of the molecule (2), respectively.

δD of the organic solvent (S1) is, for example, 13 to 17, and preferably 14 to 16.

δP of the organic solvent (S1) is, for example, 3 to 8, and preferably 4 to 7.

δH of the organic solvent (S1) is, for example, 2 to 8, and preferably 3 to 7.

The organic solvent (S1) is preferably an ether-based solvent. Specific examples of the organic solvent (S1) include a compound represented by General Formula (S1-1). The rinsing solution according to the present aspect is excellent in the effect of preventing pattern collapse because it contains the compound represented by General Formula (S1-1). In addition, since the rinsing solution contains a compound represented by the following Formula (S1-1), watermark defects can be reduced. The compound represented by the following Formula (S1-1) has high compatibility with $CO_2$ and can be suitably used as an organic solvent for a supercritical drying process.

(S1-1)

$$R^1\text{—}(OCH_3)_{n1}$$

[In Formula (S1-1), $R^1$ represents a linear or branched saturated aliphatic hydrocarbon group having 1 to 3 carbon atoms; and n1 represents 2 or 3.]

The organic solvent (S1) is required to be able to replace a water rinsing solution in a case where rinsing with water is carried after chemical treatment. In this case, since solubility in water is required, $R^1$ in General Formula (S1-1) has 1 to 3 carbon atoms.

The compound represented by General Formula (S1-1) preferably contains at least one organic solvent that is selected from the group consisting of dimethoxyethane, dimethoxypropane, and trimethoxypropane.

Specific examples of the compound represented by General Formula (S1-1) include 1,2-dimethoxyethane (a compound represented by the following Formula (S1-1-1)), 2,2-dimethoxypropane (a compound represented by the following Formula (S1-1-2)), 1,1,1-trimethoxypropane (a compound represented by the following Formula (S1-1-3)), 1,2,3-trimethoxypropane (a compound represented by the following Formula (S1-1-4)), and 1,1,3-trimethoxypropane (a compound represented by the following Formula (S1-1-5)).

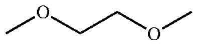
(S1-1-1)

(S1-1-2)

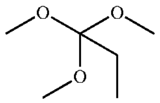
(S1-1-3)

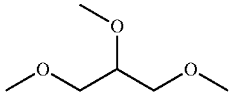
(S1-1-4)

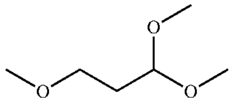
(S1-1-5)

The organic solvent (S1) or the compound represented by Formula (S1-1) (hereinafter, collectively referred to as an "(S1) component") may be used alone, or two or more thereof may be used in combination.

A content of the (S1) component in the rinsing solution of the present embodiment is preferably equal to or greater than 30% by mass, more preferably equal to or greater than 50% by mass, still more preferably equal to or greater than 60% by mass, and particularly preferably equal to or greater than 70% by mass with respect to a total mass of the rinsing solution. The content of the (S1) component in the rinsing solution of the present embodiment may be 100% by mass with respect to the total mass of the rinsing solution. Examples of the content of the (S1) component in the rinsing solution of the present embodiment include 30% to 100% by mass, 50% to 100% by mass, 60% to 100% by mass, 70% to 100% by mass, 80% to 100% by mass, and the like with respect to the total mass of the rinsing solution. In a case where the content of the (S1) component is within the above preferable range, the effect of preventing pattern collapse is further improved.

<Optional Component>

The rinsing solution of the present embodiment may contain an optional component in addition to the (S1) component. Examples of the optional component include an organic solvent (hereinafter also referred to as an "organic solvent (S2)") other than the organic solvent (S1).

Examples of the organic solvent (S2) include an organic solvent having a dynamic viscosity of greater than $1.05\times10^6$ $m^2/s$, an organic solvent containing a hydroxyl group, and an organic solvent containing a fluorine atom. Examples of the organic solvent having a dynamic viscosity of greater than $1.05\times10^6$ $m^2/s$ include protic polar solvents such as a glycol-based solvent, a glycol-ether-based solvent, and an alcohol-based solvent; aprotic polar solvents such as an ester-based solvent, an amide-based solvent, a sulfoxide-based solvent, and a nitrile-based solvent; hydrocarbon-based solvents and other solvents. Examples of the organic solvent containing a hydroxyl group include protic polar solvents such as a glycol-based solvent, a glycol-ether-based solvent, and an alcohol-based solvent. Examples of the organic solvent containing a fluorine atom include an organic solvent in which one or more hydrogen atoms of the above-described organic solvents are substituted with fluorine atoms.

Examples of the organic solvent (S2) include an alcohol-based solvent. Specific examples of the alcohol-based solvent include 2-propanol.

One of the organic solvents (S2) may be used alone, or two or more thereof may be used in combination.

A content of the organic solvent (S2) in the rinsing solution of the present embodiment is preferably equal to or smaller than 70% by mass, more preferably equal to or smaller than 50% by mass, still more preferably equal to or smaller than 40% by mass, and particularly preferably equal to or smaller than 30% by mass with respect to the total mass of the rinsing solution. Examples of the content of the organic solvent (S2) in the rinsing solution of the present embodiment include 0% to 70% by mass, 0% to 60% by mass, 0% to 50% by mass, 0% to 40% by mass, 0% to 30% by mass, 0% to 20% by mass, and 0% to 10% by mass with respect to the total mass of the rinsing solution.

Examples of a ratio (mass ratio) of the (S1) component to the organic solvent (S2), [(S1) component/organic solvent (S2)] include 20/80 to 100/0, 30/70 to 100/0, 40/60 to 100/0, 50/50 to 100/0, 60/40 to 100/0, 70/30 to 100/0, 80/20 to 100/0, and 90/10 to 100/0.

In a case where the content of the organic solvent (S2) is within the above preferable range, the effect of preventing pattern collapse is further improved. In a case where the ratio (mass ratio) of the (S1) component to the organic solvent (S2) is within the above preferable range, the effect of preventing pattern collapse is further improved.

Examples of optional components other than the organic solvent (S2) include metal chelating agents (aminocarboxylic acid-based chelating agents, phosphonic acid-based chelating agents, acetylene alcohol, and other agents), pH adjusters, surfactants, and other components.

The rinsing solution of the present embodiment may not contain the organic solvent (S2). The rinsing solution of the present embodiment may not contain the organic solvent having a dynamic viscosity of greater than $1.05\times10^{6}$ $m^2/s$. The rinsing solution of the present embodiment may not contain one or more selected from the group consisting of a glycol-based solvent, a glycol-ether-based solvent, and an alcohol-based solvent. The rinsing solution of the present embodiment may not contain a protic polar solvent. The rinsing solution of the present embodiment may not contain one or more selected from the group consisting of an ester-based solvent, an amide-based solvent, a sulfoxide-based solvent, and a nitrile-based solvent. The rinsing solution of the present embodiment may not contain an aprotic polar solvent. The rinsing solution of the present embodiment may not contain an organic solvent containing fluorine. The rinsing solution of the present embodiment may not contain a hydrocarbon-based solvent. The rinsing solution of the present embodiment may not contain 2-propanol. The rinsing solution of the present embodiment may not contain organic solvents other than the compound represented by General Formula (S1-1). The rinsing solution of the present embodiment may not contain a surfactant. The rinsing solution of the present embodiment may not contain a metal chelating agent. The rinsing solution of the present embodiment may not contain a pH adjuster. The rinsing solution of the present embodiment may not contain water. The rinsing solution of the present embodiment may not contain a water repellent agent.

<Impurities and the Like>

The rinsing solution of the present embodiment may contain metal impurities including metal atoms such as Fe atoms, Cr atoms, Ni atoms, Zn atoms, Ca atoms, Pb atoms, or the like. A total content of the metal atoms in the rinsing solution of the present embodiment is preferably equal to or smaller than 100 ppt by mass with respect to the total mass of the rinsing solution. The lower limit value of the total content of the metal atoms is preferably as low as possible, and the lower limit value may be, for example, equal to or greater than 0.001 ppt by mass. Examples of the total content of the metal atoms include 0.001 ppt by mass to 100 ppt by mass. By setting the total content of the metal atoms to equal to or smaller than the preferable upper limit value, a property of preventing defects and a property of preventing residues of the rinsing solution are improved. By setting the total content of the metal atoms to equal to or greater than the preferable lower limit value, it is believed that the metal atoms are less likely to exist in isolation in the system, and thereby less likely to adversely affect the production yield of all of objects subjected to rinsing.

A content of the metal impurities can be adjusted by, for example, purification processing such as filtering. The purification processing such as filtering may be carried out on a part or all of the raw material before preparing the rinsing solution, or may be carried out after the rinsing solution is prepared.

The rinsing solution of the present embodiment may contain, for example, organic-derived impurities (organic impurities). A total content of the organic impurities in the rinsing solution of the present embodiment is preferably equal to or smaller than 5000 ppm by mass. The lower limit of the total content of the organic impurities is preferably as low as possible, and the lower limit value may be, for example, equal to or greater than 0.1 ppm by mass. The total content of the organic impurities is, for example, 0.1 ppm by mass to 5000 ppm by mass.

The rinsing solution of the present embodiment may contain, for example, objects to be counted having a size counted by a light scattering liquid-borne particle counter. The size of the objects to be counted is, for example, equal to or greater than 0.04 μm. The number of the objects to be counted in the rinsing solution of the present embodiment is, for example, equal to or smaller than 1,000 per 1 mL of the rinsing solution, and the lower limit value is, for example, equal to or greater than 1.

The organic impurities and/or the objects to be counted may be added to the rinsing solution, or may be unavoidably incorporated into the rinsing solution during a step of producing the rinsing solution. Examples of the case where the organic impurities are unavoidably incorporated in the step of producing the rinsing solution include a case where organic impurities are contained in raw materials (for example, organic solvents) used in the step of producing the rinsing solution, and a case where organic impurities in an external environment are incorporated (for example, contamination) at the step of producing the rinsing solution, but are not limited to these. In a case where the objects to be counted are added to the rinsing solution, an abundance ratio may be adjusted for each specific size in consideration of a surface roughness of a rinsing target.

The organic solvent (organic solvent (S1), the compound represented by General Formula (S1-1), and the optional organic solvent (S2)) used in the rinsing solution of the present embodiment may be purified by a known method. A method of purifying an organic solvent is not particularly limited, and a known method can be used. Examples of the method of purifying an organic solvent include distillation purification. The organic solvent may be treated with filtration with a filter, an ion exchange resin, or the like in order to reduce metal impurities, organic impurities, and other impurities. In order to reduce metal impurities, for example, treatment with chelate filter filtration, an ion exchange resin, or the like can be carried out. In order to remove particulate impurities, for example, a polyethylene filter, a polypropylene filter, a polytetrafluoroethylene filter, a nylon filter, a polyimide filter, a polyamideimide filter, a polyamide filter, or other filters can be used.

The purity of the organic solvent is preferably equal to or greater than 99%, more preferably equal to or greater than 99.5%, and still more preferably equal to or greater than 99.9%.

<Storage Container>

A method of storing a rinsing solution of the present embodiment is not particularly limited, and known storage containers in the related art can be used. In order to ensure the stability of the rinsing solution, a porosity in the container when the rinsing solution is stored in the container, and/or the type of gas with which voids are filled may be appropriately set. For example, the porosity in the storage container is about 0.01% to 30% by volume.

<Substrate>

The rinsing solution according to the present embodiment is used to rinse a substrate with a protrusion portion.

The substrate is not particularly limited, and known substrates in the related art can be used. The substrate can be any substrate used to manufacture integrated circuit devices, optical devices, micromachines, mechanical precision devices, and other devices.

Examples of the substrate include a silicon (Si) substrate, a silicon nitride (SiN) substrate, a silicon oxide film (Ox) substrate, a silicon carbide (SiC) substrate, a tungsten (W) substrate, a tungsten carbide (WC) substrate, a cobalt (Co) substrate, a titanium nitride (TiN) substrate, a tantalum nitride (TaN) substrate, a germanium (Ge) substrate, a silicon germanium (SiGe) substrate, an aluminum (Al) substrate, a nickel (Ni) substrate, a titanium (Ti) substrate, a ruthenium (Ru) substrate, a copper (Cu) substrate, and other substrates.

Using a silicon (Si) substrate as an example, a substrate having a surface on which a silicon oxide film, such as a natural oxide film, a thermal oxide film, and a vapor-phase synthetic film (such as a CVD film), is formed may be used, and a substrate having a pattern that is formed on the silicon oxide film may be used.

A substrate to which the rinsing solution of the present embodiment is applied has a protrusion portion formed on its surface. The protrusion portion included in the substrate may be line-shaped or pillar-shaped. In a case where the protrusion portion is pillar-shaped, a shape of the pillar is not particularly limited. Examples of the shape of the pillar include a columnar shape, a polygonal columnar shape (such as a square columnar shape), and other shapes.

The number of the protrusion portions included in the substrate is not particularly limited. The number of the protrusion portions may be one, or may be two or more. In a case where there are two or more protrusion portions, a recessed portion is formed between the protrusion portions, which is also called an unevenness pattern. The substrate preferably has an unevenness pattern.

Figure 5:
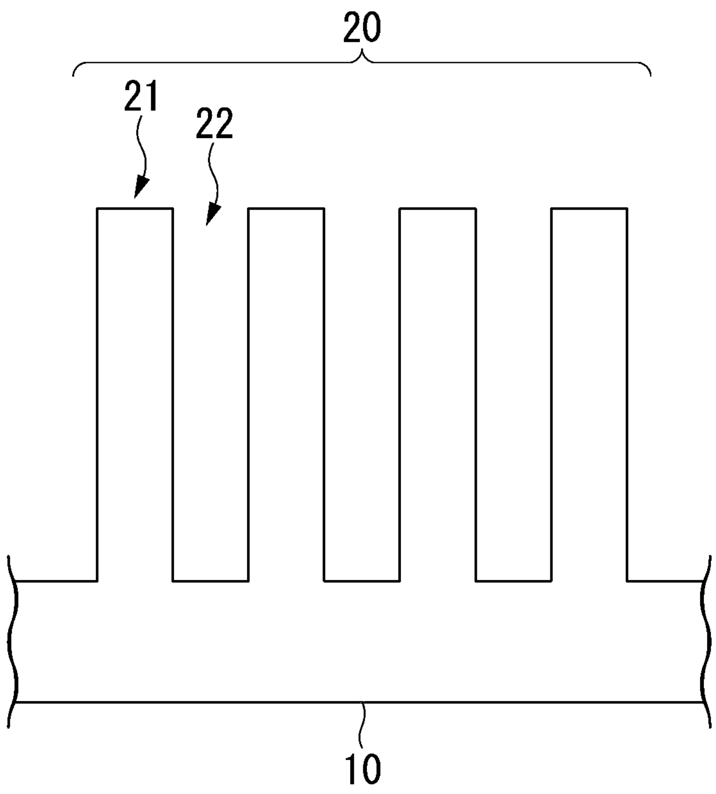
FIG. 5 shows an example of an unevenness pattern.

FIG. 5 shows an example of the unevenness pattern. The unevenness pattern shown in FIG. 5 is composed of a plurality of protrusion portions 21 and a plurality of recessed portions 22. The unevenness pattern 20 is formed on a surface of a substrate 10.

An aspect ratio of the protrusion portions (unevenness pattern) of the substrate is preferably equal to or greater than 4, more preferably equal to or greater than 6, still more preferably equal to or greater than 8, and particularly preferably equal to or greater than 10. The aspect ratio of the protrusion portions may be equal to or greater than 11, equal to or greater than 12, equal to or greater than 13, equal to or greater than 14, equal to or greater than 15, equal to or greater than 16, equal to or greater than 17, or equal to or greater than 18. The upper limit value of the aspect ratio of the protrusion portions (unevenness pattern) is not particularly limited, but examples thereof include equal to or smaller than 30, equal to or smaller than 25, or equal to or smaller than 20. The aspect ratio of the protrusion portions (unevenness pattern) may be within the range of, for example, 4 to 30, 6 to 25, 8 to 25, 10 to 25, 15 to 25, or 15 to 20. Since the rinsing solution of the present embodiment has a high effect of preventing pattern collapse, the rinsing solution can be suitably used for a substrate with a protrusion portion with a high aspect ratio.

The size of a protrusion portion is not particularly limited. In a case where the protrusion portion is pillar-shaped, examples of a diameter of the pillar include 10 to 50 nm, 15 to 30 nm, and 15 to 25 nm.

In a case where the protrusion portion is line-shaped, a line width is, for example, equal to or smaller than 50 nm, equal to or smaller than 32 nm, and equal to or smaller than 22 nm. The substrate may have a line and space pattern (LS pattern). As a line width and a line-to-line dimension of the LS pattern, for example, equal to or smaller than 50 nm, equal to or smaller than 32 nm, and equal to or smaller than 22 nm can be mentioned. The line width and the line-to-line dimension can be within the range of, for example, 10 to 50 nm, 15 to 32 nm, and 15 to 22 nm.

Since the rinsing solution of the present embodiment has a high effect of preventing pattern collapse, the rinsing solution can be suitably used for a substrate having fine patterns.

The protrusion portion of the substrate may be formed on a surface of an inorganic layer or may be formed on a surface of an organic layer. The substrate preferably has an inorganic pattern formed on the inorganic layer or an organic pattern formed on the organic layer.

An example of the inorganic pattern includes an inorganic pattern obtained by the procedure of: forming an etching mask on the surface of the inorganic layer present on the substrate by a photoresist method; and then performing an etching treatment thereon. Examples of the inorganic layer include, in addition to the substrate itself, a layer made of oxides of elements constituting the substrate, a layer made of inorganic substances, such as silicon nitride, titanium nitride, or tungsten formed on the surface of the substrate, and other layers. Examples of the inorganic layer include, but are not particularly limited to, inorganic layers formed during a manufacturing process of semiconductor devices.

Examples of the organic pattern include a resin pattern formed on a substrate by a photolithography method using a photoresist or the like. The organic pattern can be formed by, for example, forming an organic layer, which is a photoresist film, on the substrate, exposing this organic layer through a photomask, and carrying out development thereon. The organic layer may be an organic layer provided on a surface of a laminated film provided on the surface of the substrate or the like, in addition to the surface of the substrate itself. Examples of the organic layer include, but are not particularly limited to, an organic film provided for etching and forming a mask in the manufacturing process of semiconductor devices.

Figure 2:
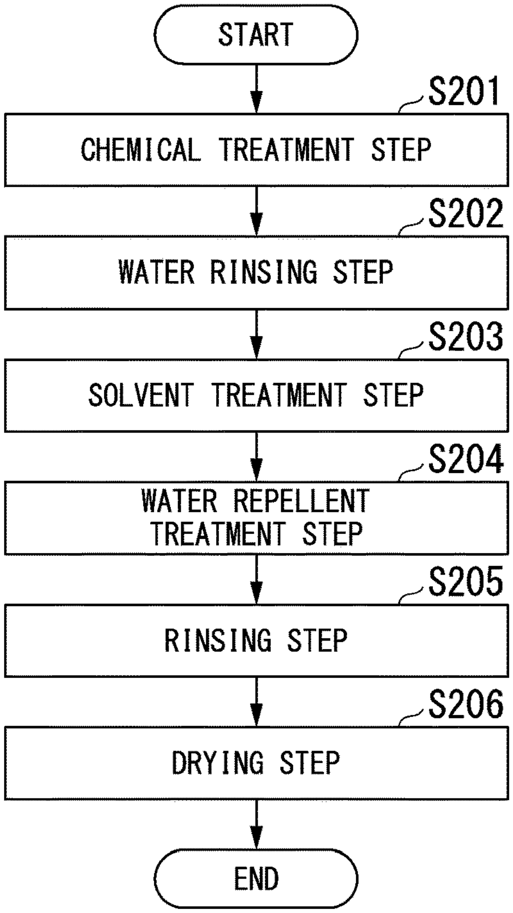
FIG. 2 is a flowchart showing an example of a method of treating a substrate.
Figure 3:
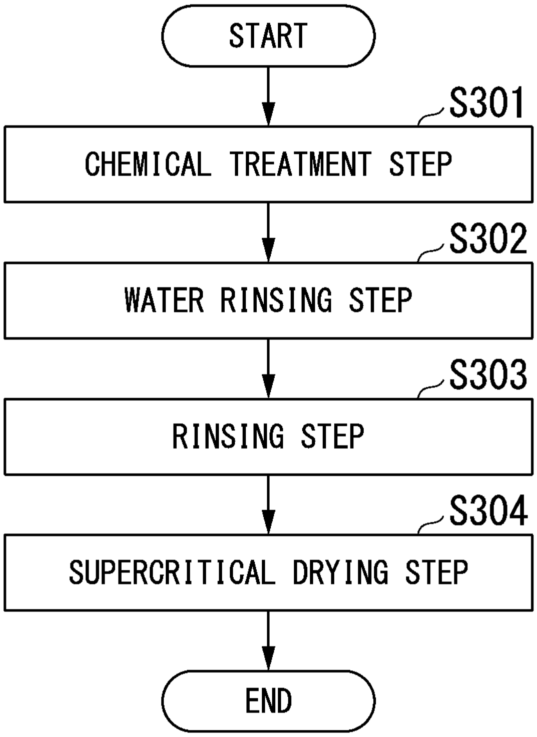
FIG. 3 is a flowchart showing an example of a method of treating a substrate.

The rinsing solution according to the present embodiment is used for rinsing before drying the substrate. FIGS. 1 to 3 each show an example of a method of treating a substrate to which the rinsing solution of the present embodiment is applied.

In the method of treating a substrate shown in FIG. 1, the substrate is treated with a chemical (stripping fluid, cleaning solution, etching solution, or the like) in a chemical treatment step (S101), the substrate is rinsed with a water rinsing solution in a water rinsing step (S102), the substrate is rinsed with the rinsing solution of the present embodiment in a rinsing step (S103), and the substrate is dried in a drying step (S104). As described above, the rinsing solution of the present embodiment is used in the rinsing step (S103) immediately before the drying step (S104).

In a method of treating a substrate shown in FIG. 2, the substrate is treated with a chemical in a chemical treatment step (S201), the substrate is rinsed with a water rinsing solution in a water rinsing step (S202), the substrate is treated with a solvent in a solvent treatment step (S203), the substrate is treated with a water repellent agent in a water repellent treatment step (S204), the substrate is rinsed with the rinsing solution of the present embodiment in a rinsing step (S205), and the substrate is dried in a drying step (S206). As described above, the rinsing solution of the present embodiment is used in the rinsing step (S206) immediately before the drying step (S205).

In the method of treating a substrate shown in FIG. 3, the substrate is treated with a chemical in a chemical treatment step (S301), the substrate is rinsed with a water rinsing solution in a water rinsing step (S302), the substrate is rinsed with the rinsing solution of the present embodiment in a rinsing step (S303), and the substrate is subjected to supercritical drying in a drying step (S304). As described above, the rinsing solution of the present embodiment is used in the rinsing step (S303) immediately before the supercritical drying step (S304).

During the drying of a substrate having an unevenness pattern, pattern collapse may occur due to the capillary force of a rinsing solution remaining in the pattern. In particular, in a case where the substrate has a pattern with a high aspect ratio, pattern collapse is likely to occur. However, pattern collapse can be prevented during the drying by the substrate being rinsed with the rinsing solution of the present embodiment before drying the substrate.

It is believed that the rinsing solution of the present embodiment that contains the organic solvent (S1) having a dynamic viscosity of equal to or smaller than $1.05\times10^{6}$ $m^2/s$ and containing no hydroxyl group or fluorine atom, or that contains the compound represented by General Formula (S1-1) enables a uniform fluid film to be formed on the substrate surface. According to this, it is presumed that, during the drying of the substrate, the rinsing solution substantially evenly remaining in the recessed portions of the pattern is evenly removed, thereby preventing the pattern collapse.

In addition, since the organic solvent (S1) or the compound represented by General Formula (S1-1) has no fluorine atom, the method of treating a substrate can be achieved with low environmental load.

(Method of Treating Substrate)

A method of treating a substrate according to a third aspect of the present invention includes a step (A) of bringing the rinsing solution according to the first aspect or the second aspect into contact with the surface of the substrate with the protrusion portion, the protrusion portion being formed on the surface, and a step (B) of removing the rinsing solution from the surface on which the protrusion portion is formed. The method of treating a substrate according to this aspect is applied to the substrate with the protrusion portion.

<Step (A)>

The step (A) is a step of bringing the rinsing solution according to the first aspect or the second aspect into contact with the surface of the substrate with the protrusion portion, the protrusion portion being formed on the surface.

The “substrate with the protrusion portion” is the same as that described in the above section “(rinsing solution)”.

In the step (A), the rinsing solution is brought into contact with the surface of the substrate with the protrusion portion. The method of bringing the rinsing solution into contact with the surface of the substrate is not particularly limited, and any known method can be used. Examples of such methods include a spin coating method, an immersion method (dip method), a spray method, and a liquid filling method (paddle method).

The spin coating method is a method of supplying a rinsing solution to a substrate while rotating the substrate by using a spin coater or the like. Examples of the method of supplying a rinsing solution include a method of spraying a rinsing solution onto a substrate, a method of adding the rinsing solution dropwise onto a substrate, and other methods.

The immersion method (dip method) is a method of immersing a substrate in a rinsing solution.

The spray method is a method of spraying a rinsing solution into a transport space while a substrate is transported in a predetermined direction.

The liquid filling method (paddle method) is a method in which the rinsing solution is piled up by surface tension, left on the substrate, and left stationary for a certain period of time.

As the method of bringing the rinsing solution into contact with the substrate surface, a spin coating method is preferable. The spin rotation speed in the spin coating method is, for example, 100 to 5000 rpm, 500 to 3000 rpm, or 800 to 2000 rpm.

The temperature at which the step (A) is performed is not particularly limited. The temperature is, for example, 15° C. to 50° C. Examples of a time period in which the rinsing solution is in contact with the substrate include 10 seconds to 10 minutes, 20 seconds to 5 minutes, 30 seconds to 250 seconds, and 60 seconds to 200 seconds.

After the fluid film formed of the rinsing solution is formed on the surface of the substrate, the substrate may be heated. By heating the substrate, a vapor film formed of the rinsing solution is formed between the fluid film and an upper surface of the substrate. The heating temperature is, for example, 50° C. to 70° C. Heating can be carried out with a heating plate or the like.

<Step (B)>

The step (B) is a step of removing the rinsing solution from the surface of the substrate with the protrusion portion.

The substrate can be dried by the complete removal of the rinsing solution from the surface of the substrate. Therefore, the step (B) may be a step of drying the substrate.

The removal of the rinsing solution from the surface of the substrate can be performed by a known method. Examples of the method of removing the rinsing solution from the surface of the substrate include spin drying, nitrogen blow drying, supercritical drying, and other drying methods.

The spin drying is a method of rotating a substrate to shake off and remove a rinsing solution from a surface of a substrate by centrifugal force.

The nitrogen blow drying is a method of blowing nitrogen gas onto a surface of a substrate to remove a rinsing solution from the surface of the substrate.

The supercritical drying is a method of bringing a supercritical fluid into contact with a surface of a substrate to remove a rinsing solution from the surface of the substrate.

<Optional Steps>

The method of the present embodiment may include optional steps in addition to the steps (A) and (B). Examples of the optional steps include a chemical treatment step, a water rinsing step, a water repellent treatment step, and a solvent treatment step.

<<Chemical Treatment Step>>

The chemical treatment step is a step of treating a substrate with a desired chemical. The chemical can be appropriately selected according to the type of the substrate and the type of treatment. Examples of the chemical include, but are not limited to, a stripping solution such as a resist or an adhesive, a cleaning solution, an etching solution, and the like. The chemicals such as the stripping solution, the cleaning solution, and the etching solution have effects such as removal of particles adhering to the substrate and removal of residues after dry etching.

The chemical treatment is usually carried out on the surface of the substrate with the protrusion portion (for example, the surface with the unevenness pattern). The chemical treatment can be carried out by bringing a chemical into contact with the surface of the substrate with the protrusion portion. A method of bringing a chemical into contact with the surface of the substrate is not particularly limited, and any known method can be used. Examples of the method of bringing a chemical into contact with the substrate include the same method as the method described in the step (A).

Examples of the chemical treatment step include a cleaning step using a cleaning solution. A cleaning method in the cleaning step can be appropriately selected according to the type of substrate to be cleaned, and the like. As the cleaning method, a known method of cleaning a substrate can be used without particular limitation.

Examples of the cleaning method include a cleaning method conforming to the known RCA cleaning method. In the RCA cleaning method, the substrate is first immersed in an SC-1 solution made of hydrogen peroxide and ammonium hydroxide to remove fine particles and organic matter from a substrate. Next, the substrate is immersed in a hydrofluoric acid aqueous solution to remove a natural oxide film on a surface of the substrate. Thereafter, the substrate is immersed in an acidic SC-2 solution made of hydrogen peroxide and dilute hydrochloric acid to remove alkali ions and metal impurities which are insoluble in the SC-1 solution.

<<Water Rinsing Step>>

The water rinsing step is a step of rinsing a substrate with a water rinsing solution. The water rinsing step is usually carried out after the chemical treatment step in order to remove a chemical adhering to a surface of the substrate. In this case, the chemical adhering to the surface of the substrate is replaced with the water rinsing solution and removed.

The water rinsing step can be performed by bringing the water rinsing solution into contact with the surface of the substrate with the protrusion portion (for example, the surface having the unevenness pattern). The method of bringing the water rinsing solution into contact with the surface of the substrate is not particularly limited, and any known method can be used. Examples of the method of bringing the water rinsing solution into contact with the substrate include the same method as the method described in the step (A).

The temperature at which water rinsing is carried out is not particularly limited. The temperature is, for example, 15° C. to 80° C. Examples of a time period in which the water rinsing solution is in contact with the substrate include 10 seconds to 10 minutes, seconds to 5 minutes, 30 seconds to 250 seconds, and 50 seconds to 200 seconds.

The water rinsing solution used in the water rinsing step contains water. The water used for the water rinsing solution is preferably purified water such as distilled water, ion-exchanged water, or ultrapure water, and more preferably ultrapure water commonly used in semiconductor manufacturing. The water may contain trace components which are unavoidably incorporated.

A content of water in the water rinsing solution is preferably equal to or greater than 80% by mass, more preferably equal to or greater than 85% by mass, still more preferably equal to or greater than 90% by mass, and particularly preferably equal to or greater than 95% by mass with respect to a total mass of the water rinsing solution. The content of water in the water rinsing solution may be 100% by mass. That is, the water rinsing solution may be water.

The water rinsing solution may contain optional components in addition to water. Examples of the optional component include known additives such as surfactants, organic solvents, and the like.

Examples of the organic solvent include hydrocarbon-based solvents, ester-based solvents, ether-based solvents, ketone-based solvents, halogen-containing solvents, sulfoxide-based solvents, alcohol-based solvents, polyhydric alcohol derivatives, nitrogen-containing compound solvents, and the like. The organic solvent is preferably a water-soluble organic solvent.

Examples of the surfactant include fluorine-based surfactants, silicone-based surfactants, and the like.

Specific examples of the fluorine-based surfactants include commercially available fluorosurfactants such as BM-1000 and BM-1100 (both manufactured by BM Chemie), MEGAFAC F142D, MEGAFAC F172, MEGAFAC F173, and MEGAFAC F183 (all manufactured by DIC Corporation), FLUORAD FC-135, FLUORAD FC-170C, FLUORAD FC-430, and FLUORAD FC-431 (all manufactured by 3M), Surflon S-112, Surflon S-113, Surflon S-131, Surflon S-141, and Surflon S-145 (all manufactured by AGC Inc.), and SH-28PA, SH-190, SH-193, SZ-6032, and SF-8428 (all manufactured by Dow Corning Toray Co., Ltd.).

As the silicone-based surfactants, specifically, unmodified silicone-based surfactants, polyether-modified silicone-based surfactants, polyester-modified silicone-based surfactants, alkyl-modified silicone-based surfactants, aralkyl-modified silicone-based surfactants, reactive silicone-based surfactants, and the like can be preferably used.

As the silicone-based surfactants, commercially available silicone surfactants can be used. Specific examples of the commercially available silicone-based surfactants include Paintad M (manufactured by Dow Corning Toray Co., Ltd.), Topica K1000, Topica K2000, and Topica K5000 (all manufactured by Takachiho Industry Co., Ltd.), XL-121 (a polyether-modified silicone-based surfactant manufactured by Clariant Co.), BYK-310 (a polyester-modified silicone-based surfactant manufactured by BYK), and the like.

<<Water Repellent Treatment Step>>

The water repellent treatment step is a step of applying a water repellent treatment onto a substrate. By carrying out the water repellent treatment on the substrate, the surface of the substrate is rendered water repellent, and moisture is prevented from remaining on the surface of the substrate.

The water repellent treatment step can be carried out by bringing a water repellent agent into contact with the surface of the substrate with the protrusion portion (for example, the surface having the unevenness pattern). A method of bringing the water repellent agent into contact with the surface of the substrate is not particularly limited, and any known method can be used. Examples of the method of bringing the water repellent agent into contact with the substrate include the method described in the above step (A), and a method of bringing the vapor of the water repellent agent into contact with the surface of the substrate.

The water repellent agent is not particularly limited, and a water repellent agent generally used for water repellent treatment can be appropriately selected and used according to a material of the substrate. Examples of the water repellent agent include those containing a silylation agent.

The silylation agent is not particularly limited, and known silylation agents can be used without particular limitation. Specifically, for example, a silylation agent represented by any one of the following General Formulae (1) to (3) can be used. In the following General Formulae (1) to (3), an alkyl group has 1 to 5 carbon atoms, a cycloalkyl group has 5 to 10 carbon atoms, an alkoxy group has 1 to 5 carbon atoms, and a heterocycloalkyl group has from 5 to 10 carbon atoms.

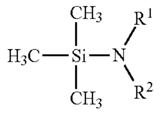

(1)

[In Formula (1), $R^1$ represents a hydrogen atom, or a saturated or unsaturated alkyl group, and $R^2$ represents a saturated or unsaturated alkyl group, a saturated or unsaturated cycloalkyl group, or a saturated or unsaturated heterocycloalkyl group. $R^1$ and $R^2$ may be bonded to each other to form a saturated or unsaturated heterocycloalkyl group having a nitrogen atom.]

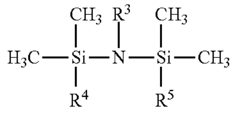

(2)

[In Formula (2), $R^3$ represents a hydrogen atom, a methyl group, a trimethylsilyl group, or a dimethylsilyl group, and $R^4$ and $R^5$ each independently represent a hydrogen atom, an alkyl group, or a vinyl group.]

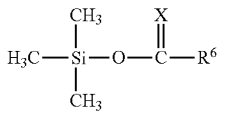

(3)

[In Formula (3), X represents O, $CHR^7$, $CHOR^7$, $CR^7R^7$, or $NR^8$, and $R^6$ and $R^7$ are each independently a hydrogen atom, a saturated or unsaturated alkyl group, a saturated or unsaturated cycloalkyl group, a trialkylsilyl group, a trialkylsiloxy group, an alkoxy group, a phenyl group, a phenethyl group, or an acetyl group, and $R^8$ represents a hydrogen atom, an alkyl group, or a trialkylsilyl group.]

Examples of the silylation agent represented by Formula (1) described above include N,N-dimethylaminotrimethylsilane, N,N-diethylaminotrimethylsilane, t-butylaminotrimethylsilane, all ylaminotrimethylsilane, trimethylsilylacetamide, trimethylsilyl piperidine, trimethylsilylimidazole, trimethylsilylmorpholine, 3-trimethylsilyl-2-oxazolidinone, trimethylsilylpyrazole, trimethylsilylpyrrolidine, 2-trimethylsilyl-1,2,3-triazole, 1-trimethylsilyl-1,2,4-triazole, and the like.

Examples of the silylation agent represented by Formula (2) described above include hexamethyldisilazane, N-methylhexamethyldisilazane, 1,2-di-N-octyltetramethyldisilazane, 1,2-divinyltetramethyldisilazane, heptamethyldisilazane, nonamethyltrisilazane, tris(dimethylsilyl)amine, and the like.

Examples of the silylation agent represented by Formula (3) described above include trimethylsilyl acetate, trimethylsilyl propionate, trimethylsilyl butyrate, trimethylsilyloxy-3-penten-2-one, and the like.

The silylation agent can be dissolved in an appropriate solvent and used. A solvent for the silylation agent is not particularly limited, and a solvent capable of dissolving the silylation agent and causing little damage to the pattern can be appropriately selected and used.

Specific examples of the solvent for the silylation agent include sulfoxides such as dimethylsulfoxide; sulfones such as dimethylsulfone, diethylsulfone, bis(2-hydroxyethyl) sulfone, and tetramethylenesulfone; amides such as N,N-dimethylformamide, N-methylformamide, N,N-dimethyl acetamide, N-methylacetamide, and N,N-diethylacetamide; lactams such as N-methyl-2-pyrrolidone, N-ethyl-2-pyrrolidone, N-propyl-2-pyrrolidone, N-hydroxymethyl-2-pyrrolidone, and N-hydroxyethyl-2-pyrrolidone; imidazolidinones such as 1,3-dimethyl-2-imidazolidinone, 1,3-diethyl-2-imidazolidinone, and 1,3-diisopropyl-2-imidazolidinone; dialkyl ethers such as dimethyl ether, diethyl ether, methyl ethyl ether, dipropyl ether, diisopropyl ether, and dibutyl ether; dialkyl glycol ethers such as dimethyl glycol, dimethyl diglycol, dimethyl triglycol, methyl ethyl diglycol, and diethyl glycol; ketones such as methyl ethyl ketone, cyclohexanone, 2-heptanone and 3-heptanone; terpenes such as p-menthane, diphenylmenthane, limonene, terpinene, bornane, norbornane and pinane; polyhydric alcohols such as ethylene glycol, diethylene glycol, propylene glycol and dipropylene glycol; derivatives of polyhydric alcohols such as compounds having an ester bond such as ethylene glycol monoacetate, diethylene glycol monoacetate, propylene glycol monoacetate, or dipropylene glycol monoacetate and compounds having an ether bond such as monoalkyl ethers or monophenyl ethers such as monomethyl ether, monoethyl ether, monopropyl ether and monobutyl ether of compounds having the above polyhydric alcohols or the ester bond [propylene glycol monomethyl ether acetate (PGMEA), propylene glycol monomethyl ether (PGME), and the like], and the like.

The concentration of the silylation agent in the water repellent agent is, for example, 0.1% to 50% by mass with respect to a total mass of the water repellent agent, preferably 0.5% to 30% by mass, and more preferably 1.0% to 20% by mass. By setting the concentration of the silylation agent within the above range, the coatability of the silylation agent can be ensured, and the effect of imparting water repellency to the surface of the substrate can be easily obtained.

The temperature at which the water repellent treatment is carried out is not particularly limited. The temperature is, for example, 15° C. to 50° C. Examples of a time period in which the water repellent agent is in contact with the substrate include 10 seconds to 10 minutes, 20 seconds to 5 minutes, 30 seconds to 250 seconds, and 50 seconds to 200 seconds.

<Solvent Treatment Step>

The solvent treatment step is a step of treating the substrate with a solvent. The solvent treatment step is carried out, for example, before the water repellent treatment step to remove the water rinsing solution adhering to the surface of the substrate. In this case, the water rinsing solution adhering to the surface of the substrate is replaced with the solvent and removed.

The solvent treatment step can be carried out by bringing a solvent into contact with the surface of the substrate with the protrusion portion (for example, the surface having the unevenness pattern). A method of bringing a solvent into contact with the surface of the substrate is not particularly limited, and any known method can be used. Examples of the method of bringing a solvent into contact with the substrate include the same method as the method described in the step (A).

The temperature at which the solvent treatment is carried out is not particularly limited. The temperature is, for example, 15° C. to 80° C. Examples of a time period in which the solvent is in contact with the substrate include 10 seconds to 10 minutes, 20 seconds to 5 minutes, 30 seconds to 250 seconds, and 50 seconds to 200 seconds.

The solvent used in the solvent treatment step can be appropriately selected according to the type of the substrate and/or the type of the water repellent agent. Examples of the solvent include the above-described organic solvent (S2). Examples of solvents include alcohol-based solvents. Specific examples of the alcohol-based solvent include 2-propanol.

Treatment Example (1)

FIG. 1 is a flowchart showing a treatment example (1) of a substrate to which the method of treating a substrate according to the present embodiment is applied. In the treatment example (1), the substrate is treated in the order of the chemical treatment step (S101), the water rinsing step (S102), the rinsing step (S103), and the drying step (S104). In the treatment example (1), the rinsing step (S103) corresponds to the above-described step (A), and the drying step (S104) corresponds to the above-described step (B).

Other treatment may or may not be carried out between the steps shown in FIG. 1. It is preferable that no other treatment be carried out between the individual steps shown in FIG. 1.

Between the individual steps shown in FIG. 1, it is preferable not to dry the surface of the substrate with the protrusion portion. That is, it is preferable to bring a treatment solution of the post-step into contact with the substrate to which a treatment solution in the pre-step has adhered so that the treatment solution of the pre-step adhering to the substrate is replaced with the treatment solution of the post-step.

For example, the treatment example (1) can be performed as follows. A substrate is treated with a chemical in the chemical treatment step (S101). In the water rinsing step (S102), the water rinsing solution is supplied to the substrate, and the chemical remaining on the substrate is replaced with the water rinsing solution. In the rinsing step (S103), the rinsing solution is supplied to the substrate, and the water rinsing solution remaining on the substrate is replaced with the rinsing solution. In the drying step (S104), the rinsing solution remaining on the substrate is removed, and the substrate is dried.

Treatment Example (2)

FIG. 2 is a flowchart showing a treatment example (2) of a substrate to which the method of treating a substrate according to the present embodiment is applied. In the treatment example (2), the substrate is treated in the order of the chemical treatment step (S201), the water rinsing step (S202), the solvent treatment step (S203), the water repellent treatment step (S204), the rinsing step (S205), and the drying step (S206). In the treatment example (2), the rinsing step (S205) corresponds to the above-described step (A), and the drying step (S206) corresponds to the above-described step (B).

Other treatment may or may not be carried out between the steps shown in FIG. 2. It is preferable that no other treatment be carried out between the individual steps shown in FIG. 2.

Between the individual steps shown in FIG. 2, it is preferable not to dry the surface of the substrate with the protrusion portion. That is, it is preferable to bring a treatment solution of the post-step into contact with the substrate to which a treatment solution in the pre-step has adhered so that the treatment solution of the pre-step adhering to the substrate is replaced with the treatment solution of the post-step.

For example, the treatment example (2) can be performed as follows. A substrate is treated with a chemical in the chemical treatment step (S201). In the water rinsing step (S202), the water rinsing solution is supplied to the substrate, and the chemical remaining on the substrate is replaced with the water rinsing solution. In the solvent treatment step (S203), the solvent is supplied to the substrate, and the water rinsing solution remaining on the substrate is replaced with the solvent. In the water repellent treatment step (S204), the water repellent agent is supplied to the substrate, and the solvent remaining on the substrate is replaced with the water repellent agent. In the rinsing step (S205), the rinsing solution is supplied to the substrate, and the water repellent agent remaining on the substrate is replaced with the rinsing solution. In the drying step (S206), the rinsing solution remaining on the substrate is removed, and the substrate is dried.

Treatment Example (3)

FIG. 3 is a flowchart showing a treatment example (3) of a substrate to which the method of treating a substrate according to the present embodiment is applied. In the treatment example (3), the substrate is treated in the order of the chemical treatment step (S301), the water rinsing step (S302), the rinsing step (S303), and the supercritical drying step (S304). In the treatment example (3), the rinsing step (S303) corresponds to the above-described step (A), and the supercritical drying step (S304) corresponds to the above-described step (B).

Other treatment may or may not be carried out between the steps shown in FIG. 3. It is preferable that no other treatment be carried out between the individual steps shown in FIG. 3.

Between the individual steps shown in FIG. 3, it is preferable not to dry the surface of the substrate with the protrusion portion. That is, it is preferable to bring a treatment solution of the post-step into contact with the substrate to which a treatment solution in the pre-step has adhered so that the treatment solution of the pre-step adhering to the substrate is replaced with the treatment solution of the post-step.

For example, the treatment example (3) can be performed as follows. A substrate is treated with a chemical in the chemical treatment step (S301). In the water rinsing step (S302), the water rinsing solution is supplied to the substrate, and the chemical remaining on the substrate is replaced with the water rinsing solution. In the rinsing step (S303), the rinsing solution is supplied to the substrate, and the water rinsing solution remaining on the substrate is replaced with the rinsing solution. In the supercritical drying step (S304), the rinsing solution remaining on the substrate is removed, and the substrate is dried.

<<Supercritical Drying Step (S304)>>

Figure 4:
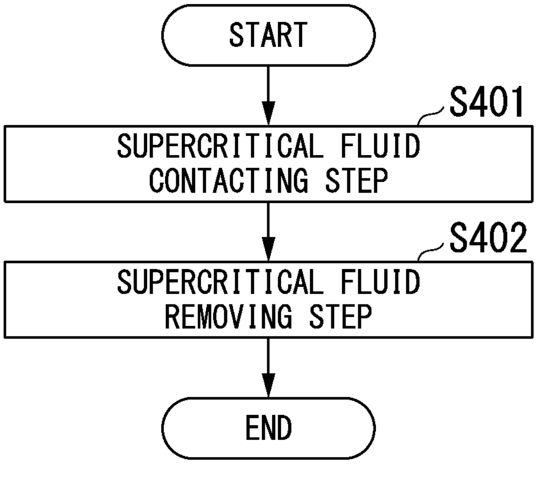
FIG. 4 is a flowchart showing the supercritical drying.

FIG. 4 is a flowchart showing the supercritical drying. The supercritical drying can be carried out in a chamber that can be heated and pressurized to a supercritical state. The chamber may be, for example, a high-pressure container made of stainless steel and having a predetermined pressure resistance.

Supercritical Fluid Contacting Step (S401):

A supercritical fluid contacting step is a step of bringing a supercritical fluid into contact with a surface of a substrate with a protrusion portion (for example, the surface having an unevenness pattern). The supercritical fluid is a substance in a supercritical state. A supercritical state is a state in which a substance is under a temperature and pressure above its critical point. The supercritical fluid has both the diffusivity of a gas and the solubility of a liquid.

Examples of a treatment fluid used as the supercritical fluid include carbon dioxide and hydrofluoroether (HFE).

A method of bringing the supercritical fluid into contact with the substrate is not particularly limited, and any known method can be used. For example, the substrate is placed in the chamber, a treatment fluid in liquid form is supplied into the chamber, and the treatment fluid in liquid form is brought into contact with the surface of the substrate with the protrusion portion. As a result, the rinsing solution adhering to the surface of the substrate dissolves in the treatment fluid. Next, the inside of the chamber is heated and pressurized so that the inside of the chamber has a temperature and pressure equal to or higher than the critical point of the treatment fluid, and as a result, the treatment fluid becomes a supercritical fluid. Thereby, the supercritical fluid can be brought into contact with the surface of the substrate (the rinsing solution adhering to the surface of the substrate).

In a case where the treatment fluid is carbon dioxide, conditions for making liquefied carbon dioxide a supercritical fluid, in which the liquefied carbon dioxide can be used as the treatment fluid in liquid form, include a temperature of 35° C. and a pressure of 7.5 MPa, for example.

Using an organic solvent that is highly compatible with the treatment fluid as the component (S1) enables the solubility of the rinsing solution in the treatment fluid to be improved. Therefore, the rinsing solution can be favorably removed in a rinsing solution removing step that will be described later. Compatibility with the treatment fluid can be determined based on, for example, similarity of Hansen solubility parameters. For example, in a case where carbon dioxide is used as the treatment fluid, it is preferable to use an organic solvent having Hansen solubility parameters similar to those of carbon dioxide as the component (S1).

Supercritical Fluid Removing Step (S402):

A supercritical fluid removing step is a step of removing a supercritical fluid from a surface of a substrate with a protrusion portion (for example, the surface having an unevenness pattern). Removing the supercritical fluid from the surface of the substrate enables the rinsing solution dissolved in the supercritical fluid to be removed together.

A method of removing the supercritical fluid from the surface of the substrate is not particularly limited, and any known method can be used. Examples of the method of removing the supercritical fluid include a method of discharging the supercritical fluid from the inside of the chamber while depressurizing the inside of the chamber.

The method of the present embodiment is not limited to the above treatment examples (1) to (3), and any steps can be employed in any order as long as the steps (A) and (B) are included.

In the method of treating a substrate according to the present embodiment, the step (A) is performed using the rinsing solution according to the first aspect or the second aspect. Thereby, pattern collapse can be suppressed while the rinsing solution is removed from the surface of the substrate in the step (B). Therefore, the method of treating a substrate according to the present embodiment can be suitably applied to a substrate having an unevenness pattern with a high aspect ratio, which tends to cause pattern collapse.

(Method of Manufacturing Semiconductor Device)

A method of manufacturing a semiconductor device according to a fourth aspect of the present invention includes a step of treating a substrate with a protrusion portion by the method of treating a substrate according to the third aspect.

<Step of Treating Substrate>

A step of treating a substrate can be carried out in the same manner as the method described in the above section "(Method of Treating Substrate)".

<Optional Steps>

The method of manufacturing a semiconductor device according to the present embodiment may include optional steps in addition to the step of treating the substrate. The optional steps are not particularly limited, and include known steps that are performed during the manufacturing of semiconductor devices. Examples of such steps include, but are not limited to, formation steps of capacitor formation, channel formation, High-K/metal gate formation, and formation of individual structures such as a metal wiring, a gate structure, a source structure, a drain structure, an insulating layer, a ferromagnetic layer, and a nonmagnetic layer (such as layer formation, etching other than the above-described etching, chemical-mechanical polishing, transformation), a resist film formation step, a light exposure step, a development step, a heat treatment step, a cleaning step, an inspection step, and the like. These other steps can be appropriately carried out before or after the step of treating the substrate, as required.

In the method of manufacturing semiconductor according to the present embodiment, since the substrate is treated by the method of treating a substrate according to the third aspect, pattern collapse during the treatment can be prevented. Therefore, semiconductor devices can be manufactured efficiently.

EXAMPLES

Hereinafter, the present invention will be described in more detail with reference to Examples, but the present invention is not limited thereto.

<Selection of Organic Solvent>

In order to prepare a rinsing solution having a higher effect of preventing pattern collapse than 2-propanol (IPA), physical property values of various organic solvents were compared. Focusing on a dynamic viscosity among the physical properties, an organic solvent having a lower dynamic viscosity than 2-propanol was selected. Tables 1 to 3 show various physical property values of the selected organic solvents.

TABLE 1

| | Boiling point (° C.) | Melting point (° C.) | Surface tension (25° C.) | Density (g/ml) | Viscosity (cp) | Dynamic viscosity ($m^2/s$) |
|---|---|---|---|---|---|---|
| 1,2-dimethoxyethane | 85 | −6 | 22.5 | 0.867 | 0.5 | 0.58E−06 |
| 2,2-dimethoxypropane | 83 | −5 | 18.5 | 0.847 | 0.452 | 0.53E−06 |
| 1,1,1-trimethoxypropane | 117.5 | 15 | 19.8 | 0.897 | 0.834 | 0.93E−06 |
| 1,2,3-trimethoxypropane | 132.8 | 26 | 23.0 | 0.912 | 0.878 | 0.96E−06 |
| 1,1,3-trimethoxypropane | 133.1 | 27 | 23.0 | 0.908 | 0.878 | 1.03E−06 |
| 2-propanol | 82.4 | 12 | 21.5 | 0.786 | 2.43 | 3.1E−06 |

TABLE 2

| | Critical temperature (K) | Latent heat of vaporization at boiling point (KJ/mol) Joback method | Scifinder | Latent heat of vaporization (Watson Formula) (KJ/mol) 25° C. | 60° C. |
|---|---|---|---|---|---|
| 1,2-dimethoxyethane | 500.99 | 29.32 | 32.42 ± 0.0 | 31.71 | 29.51 |
| 2,2-dimethoxypropane | 532.08 | 30.25 | 31.01 ± 3.0 | 31.64 | 33.62 |
| 1,1,1-trimethoxypropane | 577.20 | 34.88 | 32.93 ± 3.0 | 39.40 | 41.43 |
| 1,2,3-trimethoxypropane | 573.01 | 35.79 | 36.46 ± 3.0 | 40.78 | 42.91 |
| 1,1,3-trimethoxypropane | 573.01 | 38.56 | 39.85 ± 0.0 | 40.78 | 42.91 |
| 2-propanol | 525.64 | 38.56 | 39.85 ± 0.0 | 43.49 | 40.82 |

TABLE 3

| | Hansen solubility parameters δD | δP | δH |
|---|---|---|---|
| 1,2-dimethoxyethane | 15.5 | 6.18 | 6.49 |
| 2,2-dimethoxypropane | 14.8 | 4.75 | 3.99 |
| 1,1,1-trimethoxypropane | 15.4 | 4.7 | 4.2 |
| 1,2,3-trimethoxypropane | 15.7 | 5.9 | 5.4 |
| 1,1,3-trimethoxypropane | 15.7 | 5.9 | 5.2 |
| 2-propanol | 15.47 | 7.18 | 12.84 |
| $H_2O$ | 15.5 | 16 | 42.3 |
| $CO_2$ | 15.7 | 5.3 | 6.7 |

The physical property values shown in Tables 1 to 3 are the following values.

Boiling points and melting points indicate actual measurement values. In this case, estimated values obtained by HSPiP indicate 1,1,1-trimethoxypropane, 1,2,3-trimethoxypropane, and 1,1,3-trimethoxypropane.

The surface tension indicates estimated values obtained by HSPiP.

The density indicates actual measurement values obtained by a densimeter (DA-650, ENDO SCIENTIFIC INSTRUMENT Co., Ltd.). In this case, estimated values obtained by HSPiP indicate 1,1,1-trimethoxypropane, 1,2,3-trimethoxypropane, and 1,1,3-trimethoxypropane.

The viscosity indicates actual measurement values obtained by a viscometer (VMC-252, Rigosha & Co., Ltd.). In this case, estimated values obtained by HSPiP indicate 1,1,1-trimethoxypropane, 1,2,3-trimethoxypropane, and 1,1,3-trimethoxypropane.

The dynamic viscosity indicates values calculated according to the following Formula.

$$\text{Dynamic viscosity } (m^2/s) = \text{viscosity } (cp)/\text{density } (g/ml)$$

The critical temperature indicates a physical property estimated value obtained by the Joback method.

The latent heat of vaporization at the boiling point indicate estimated values obtained by the Joback method and literature values described in Scifinder.

The latent heat of vaporization at 25° C. and 60° C. indicates values estimated according to the Watson Formula.

The Hansen solubility parameters were estimated by HSPiP.

<Preparation of Rinsing Solution>

Examples 1 to 4 and Comparative Example 1

A rinsing solution for each Example shown in Table 4 was prepared. In Table 4, values in brackets [ ] indicate % by mass with respect to a total mass of the rinsing solution.

TABLE 4

| | Composition |
|---|---|
| Example 1 | 1,2-dimethoxyethane [100] |
| Example 2 | 2,2-dimethoxypropane [100] |
| Example 3 | 1,1,1-trimethoxypropane [100] |
| Example 4 | 2,2-dimethoxypropane [70]<br>1,1,1-trimethoxypropane [30] |
| Comparative Example 1 | 2-propanol [100] |

<Method of Treating Substrate (1)>

A 12-inch silicon wafer having a pattern with pillars provided at intervals of 100 nm was used as a substrate. A pillar aspect ratio was 18.5 and a pillar diameter was 20 nm. Wafer pieces each with a size of 2 cm×1 cm were prepared and subjected to the following treatments in order. The wafer pieces were not allowed to dry between treatments with each chemical.

1. Immersion of wafer piece in dilute hydrofluoric acid (DHF; HF:water=1:100) for 30 seconds.

2. Immersion of wafer piece in ultrapure water (UPW) for 60 seconds.
3. Immersion of wafer piece in rinsing solution of each example for 60 seconds.
4. Nitrogen blow dry.

<Evaluation (1) of Pattern Collapse>

Top-down observation was carried out using a scanning electron microscope S-9220 (accelerating voltage: 800 V, manufactured by Hitachi High-Tech Corporation.). For each wafer piece treated with each rinsing solution in each Example, three SEM pictures were taken and the number of collapsed pillars was counted. Since pillar collapse varies from chip center to edge, the number of collapsed pillars was counted in a structure resulting from essentially the same center-to-edge distance. The results are shown in Table 5 as "Number of collapsed pillars". A smaller number of collapsed pillars indicates a better collapsing prevention effect.

TABLE 5

| | Number of collapsed pillars |
|---|---|
| Example 1 | 88, 94, 84 |
| Example 2 | 78, 80, 64 |
| Example 3 | 82, 78, 88 |
| Example 4 | 82, 66, 76 |
| Comparative Example 1 | >200, >200, >200 |

It can be seen from the results in Table 5 that the numbers of collapsed pillars in Examples 1 to 4 were significantly reduced as compared with Comparative Example 1.

<Preparation of Rinsing Solution>

Examples 5 to 9 and Comparative Example 2

A rinsing solution for each Example shown in Table 6 was prepared. In Table 6, values in brackets [ ] indicate % by mass with respect to a total mass of the rinsing solution.

TABLE 6

| | Composition |
|---|---|
| Example 5 | 2,2-dimethoxypropane [100] |
| Example 6 | 2,2-dimethoxypropane [70]<br>1,1,1-trimethoxypropane [30] |
| Example 7 | 1,1,1-trimethoxypropane [100] |
| Example 8 | 2-propanol [30]<br>1,1,1-trimethoxypropane [70] |
| Example 9 | 2-propanol [50]<br>1,1,1-trimethoxypropane [50] |
| Comparative Example 2 | 2-propanol [100] |

<Method of Treating Substrate (2)>

A silicon wafer having a pattern with pillars provided at intervals of 100 nm was used as a substrate. A pillar aspect ratio was 18.5 and a pillar diameter was 20 nm.

While spinning the substrate (rotational speed: 1000 rpm, room temperature (20° C.), 1 minute), the following chemicals were sequentially supplied to the surface of the substrate with the pattern to treat the surface of the substrate.

1. Treatment of substrate in dilute hydrofluoric acid (DHF; HF:water=1:100) for seconds.
2. Treatment of substrate with ultrapure water (UPW) for 60 seconds.
3. Treatment of substrate with rinsing solution of each Example for 60 seconds at 75° C.
4. Nitrogen blow dry.

<Evaluation (2) of Pattern Collapse>

Top-down observation was carried out using a scanning electron microscope S-9220 (accelerating voltage: 800 V, manufactured by Hitachi High-Tech Corporation.). For each wafer treated with each rinsing solution in each Example, three SEM pictures were taken and the number of collapsed pillars was counted. Since pillar collapse varies from chip center to edge, the number of collapsed pillars was counted in a structure resulting from essentially the same center-to-edge distance. The results are shown in Table 7 as "Number of collapsed pillars". A smaller number of collapsed pillars indicates a better collapsing prevention effect.

TABLE 7

| | Number of collapsed pillars |
|---|---|
| Example 5 | 20, 22, 26 |
| Example 6 | 18, 22, 36 |
| Example 7 | 14, 16, 24 |
| Example 8 | 20, 28, 18 |
| Example 9 | 22, 28, 26 |
| Comparative Example 2 | 62, 65, 58 |

It can be seen from the results in Table 7 that the numbers of collapsed pillars in Examples 5 to 9 were significantly reduced as compared with Comparative Example 2. Among Examples, the number of collapsed pillars tended to be smaller in cases where the rinsing solution containing no IPA was used (Examples 5 to 7) than in cases where the rinsing solution containing IPA was used (Examples 8 and 9).

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

10: Substrate
20: Unevenness pattern
21: Protrusion portion
22: Recessed portion

What is claimed is:

1. A rinsing solution for rinsing a substrate with a protrusion portion, consisting of:

2,2-dimethoxypropane and 1,1,1-trimethoxypropane.

2. A rinsing solution for rinsing a substrate with a protrusion portion, consisting of:

1,1,1-trimethoxypropane and 2-propanol.

3. A method of processing a substrate with a protrusion portion, comprising:

(A) bringing the rinsing solution according to claim 1 into contact with a surface of a substrate with a protrusion portion, the protrusion portion being formed on the surface; and (B) removing the rinsing solution from the surface.

4. The method according to claim 3, wherein (B) is performed by drying the substrate.

5. A method of manufacturing a semiconductor device, comprising:

by the method of treating a substrate with a protrusion portion according to claim 3.

6. A method of processing a substrate with a protrusion portion, comprising:

(A) bringing the rinsing solution according to claim 2 into contact with a surface of a substrate with a protrusion portion, the protrusion portion being formed on the surface; and (B) removing the rinsing solution from the surface.

7. The method according to claim 6, wherein (B) is performed by drying the substrate.

8. A method of manufacturing a semiconductor device, comprising:

by the method of treating a substrate with a protrusion portion according to claim 6.

* * * * *